(12) United States Patent
Ackley et al.

(10) Patent No.: US 6,790,260 B2
(45) Date of Patent: Sep. 14, 2004

(54) ENHANCED RATE PSA PROCESS

(75) Inventors: Mark William Ackley, East Aurora, NY (US); James Smolarek, Boston, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/968,926

(22) Filed: Oct. 3, 2001

(65) Prior Publication Data

US 2002/0112606 A1 Aug. 22, 2002

Related U.S. Application Data

(60) Provisional application No. 60/256,485, filed on Dec. 20, 2000.

(51) Int. Cl.[7] ............................................. B01D 53/047
(52) U.S. Cl. .......................... 95/101; 95/102; 95/105; 95/130; 95/902
(58) Field of Search .......................... 95/96–106, 130, 95/902

(56) References Cited

U.S. PATENT DOCUMENTS

| | | | | |
|---|---|---|---|---|
| 4,859,217 A | * | 8/1989 | Chao | 95/130 |
| 4,964,888 A | | 10/1990 | Miller | 55/62 |
| 5,122,164 A | | 6/1992 | Hirooka et al. | 55/26 |
| 5,152,813 A | * | 10/1992 | Coe et al. | 95/902 X |
| 5,176,721 A | | 1/1993 | Hay et al. | 55/25 |
| 5,232,474 A | | 8/1993 | Jain | 55/26 |
| 5,672,195 A | * | 9/1997 | Moreau et al. | 95/902 X |
| 5,702,504 A | * | 12/1997 | Schaub et al. | 95/130 X |
| 5,891,218 A | * | 4/1999 | Rouge et al. | 95/130 X |
| 5,922,107 A | * | 7/1999 | Labasque et al. | 95/130 X |
| 6,022,397 A | * | 2/2000 | Rouge et al. | 95/902 X |
| 6,068,678 A | * | 5/2000 | Labasque et al. | 95/902 X |
| 6,152,991 A | * | 11/2000 | Ackley | 95/130 X |
| 6,171,370 B1 | * | 1/2001 | Hirano et al. | 95/902 X |
| 6,183,539 B1 | * | 2/2001 | Rode et al. | 95/902 X |
| 6,302,943 B1 | * | 10/2001 | Johnson et al. | 95/902 X |
| 6,328,786 B1 | * | 12/2001 | Labasque et al. | 95/902 X |
| 6,340,382 B1 | * | 1/2002 | Baksh et al. | 95/130 X |

FOREIGN PATENT DOCUMENTS

| | | |
|---|---|---|
| GB | 2300577 | 11/1996 |
| JP | 59-04415 | 1/1984 |
| WO | WO9943415 | 9/1999 |
| WO | WO9943416 | 9/1999 |
| WO | WO9943418 | 9/1999 |

OTHER PUBLICATIONS

Alpay et al. "Adsorbent Particle Size Effects in the Separation of Air by Rapid Pressure Swing Adsorption", *Chemical Engineering Science*, vol. 49, No. 18, pp. 3059–3075, 1994.

Wankat, "Large–Scale Adsorption and Chromatography", *CRCPress, Inc.* 1986, Indiana Engineering Chemical Research, 1987, vol. 1, pp. 64–102.

Rota et al., "Intensification of Pressure Swing Adsorption Processes", *AIChE Journal*, vol. 36, No. 9, Sep. 1990.

Lu et al., "Pressure Swing Adsorption Processes: Intraparticle Diffusion/Convection Models", *Indiana Engineering Chemical Research*, 32; 2740–2751 (1993).

Lu et al., "Intraparticle Diffusion/Convection Models for Pressurization and Blowdown of Adsorption Beds with Langmuir Isotherm", *Separation Science and Technology*, 27, 1857–1874 (1992).

* cited by examiner

*Primary Examiner*—Robert H. Spitzer
(74) *Attorney, Agent, or Firm*—David M. Rosenblum

(57) ABSTRACT

High product recovery and low BSF are achieved for fast-cycle shallow adsorbers in VPSA gas separation enabled by the coupled effects of high intrinsic adsorption rate and proper particle size selection.

16 Claims, 6 Drawing Sheets

ENHANCED RATE PSA PROCESS

This application claims priority to prior U.S. Provisional Application 60/256,485 filed Dec. 12, 2000 which is incorporated by reference in its entirety herein.

FIELD OF THE INVENTION

This invention relates to pressure swing adsorption (PSA) processes using adsorbents having high intrinsic adsorption rates. More particularly, the invention relates to PSA processes wherein high product recovery and low bed size factor (BSF) are achieved for fast-cycle shallow adsorbers.

BACKGROUND OF THE INVENTION

There has been significant development of the various PSA, VSA and VPSA methods for air separation over the past thirty years, with major advances occurring during the last decade. Commercialization of these processes and continued extension of the production range can be attributed primarily to improvements in the adsorbents and process cycles, with advances in adsorber design contributing to a lesser degree. Highly exchanged lithium molecular sieve adsorbents, as illustrated by Chao in U.S. Pat. No. 4,859,217, are representative of advanced adsorbents for oxygen production. Advanced adsorbents of the types mentioned above are the result of improvements in equilibrium properties.

Improving process efficiency and reducing the cost of the light component product can be accomplished by decreasing the amount of adsorbent required and by increasing the product recovery. The former is generally expressed in terms of bed size factor (BSF) in lbs adsorbent/TPDO (ton per day of contained $O_2$), while the latter is simply the fraction of light component (i.e. oxygen) in the feed (i.e. air) that is captured as product. Improvement in adsorbents and reduction in cycle time are two primary methods of reducing BSF.

While shorter cycles lead to shorter beds and higher adsorbent utilization, product recovery generally suffers unless adsorption rate is increased. This phenomena can be ideally characterized in terms of the size of the mass transfer zone (MTZ), i.e. the mass transfer zone becomes an increasing fraction of the adsorbent bed as the bed depth decreases. Since the adsorbent utilization with respect to the heavy component (e.g. nitrogen) is much lower in the MTZ than in the equilibrium zone, working capacity declines as this fraction increases.

The effect of particle size upon the size of the MTZ is conceptually straightforward in a single long adsorption step where a contaminant in relatively low concentration is removed from the feed stream on the basis of its higher equilibrium affinity to the adsorbent. When the adsorbate/adsorbent combination is characterized by a favorable isotherm, a steady state transfer zone is envisioned that moves through the adsorber at a constant speed. Distinct equilibrium and mass transfer zones can be identified in the process. Under such conditions, and when the resistance to mass transfer is dominated by intraparticle pore diffusion, it has long been recognized that reducing the adsorbent particle size results in higher adsorption rates and smaller mass transfer zones. Unfortunately, pressure drop across the adsorbent bed increases with decreasing particle size and leads to difficulty in particle retention in the bed and an increased tendency for fluidization.

This ideal concept becomes blurred when the isotherms are unfavorable and/or the mass transfer zone is continuously developing or spreading throughout the adsorption step. Adding the remaining minimum steps of depressurization, desorption and pressurization to create a complete adsorption process cycle further complicates the behavior and character of the mass transfer zone. Nevertheless, the idealized concept of the MTZ has been applied in the prior art as a basis to affect improvements in process performance.

Ackley et al. (WO 99/43416) have shown increased performance in PSA air separation processes through increased adsorption rates and larger mass transfer coefficients. This was accomplished while employing adsorbents of high effective pore diffusivity ($D_p \geq 5 \times 10^{-6}$ m$^2$/s) in conjunction with short cycles and shallow beds. Ackley et al. (WO 99/43418) extended these concepts to low pressure ratio cycles.

Jain (U.S. Pat. No. 5,232,474) discloses improving adsorbent utilization by decreasing the adsorbent volume and/or increasing the product purity, wherein the removal of $H_2O$ and $CO_2$ prior to cryogenic air separation is described using a pressure swing adsorption (PSA) process. The adsorber is configured entirely with alumina or with layers of alumina and 13×molecular sieve adsorbents. Smaller particles (0.4 mm to 1.8 mm) are used to achieve a smaller bed volume.

Umekawa (JP Appl. No. 59004415) shows a lower pressure drop and smaller adsorber for air purification by using a deep layer of large particles (3.2 mm) followed by a shallow layer of small particles (1.6 mm) of the same adsorbent. The bed size and pressure drop of this layered configuration are lower than for beds constructed either of all 3.2 mm or all 1.6 mm particles. The 1.6 mm particles occupy only a small fraction (low concentration part) of the mass transfer zone in the layered configuration.

Miller (U.S. Pat. No. 4,964,888) has suggested using larger particles (>14 mesh or 1.41 mm) in the equilibrium zone and small particles (<14 mesh) in the mass transfer zone. This reduces the size of the MTZ while minimizing the excessive pressure drop increase that would occur if only small particles were used in both zones. Cyclic adsorption process times greater than 30 s are indicated.

Garrett (UK Pat. Appl. GB 2 300 577) discloses an adsorption apparatus containing particles in the size range between 6 mesh (3.36 mm) and 12 mesh (1.68 mm) deployed in either discrete layers or as a gradient of sizes with the largest particles located near the feed inlet and the smallest particles located downstream near the outlet of the adsorber in both configurations.

Very small adsorbent particles (0.1 mm to 0.8 mm) are necessary for the fast cycles and high specific pressure drop that characterize a special class of processes known as rapid pressure swing adsorption (RPSA). Typical RPSA processes have very short feed steps (often less than 1.0 s) operating at high feed velocities, include a flow suspension step following the feed step and generally have total cycle times less than 20 s (often less than 10 s). The behavior of the adsorption step is far removed from the idealized MTZ concept described above. In fact, the working portion of the bed is primarily mass transfer zone with only a relatively small equilibrium zone (in equilibrium with the feed conditions) in RPSA. A major portion of the adsorber is in equilibrium with the product and provides the function of product storage. The high pressure drop (on the order of 12 psi/ft)/short cycle combination is necessary to establish an optimum permeability and internal purging of the bed which operates continuously to generate product.

RPSA air separation processes using 5A molecular sieve have been described by Jones et al. (U.S. Pat. No. 4,194,892)

for single beds and by Earls et al. (U.S. Pat. No. 4,194,891) for multiple beds. Jones has also suggested RPSA for $C_2H_4/N_2$, $H_2/CH_4$, $H_2/CO$ and $H_2/CO/CO_2/CH_4$ separations using a variety of adsorbents. The RPSA system is generally simpler mechanically than conventional PSA systems, but conventional PSA processes typically have lower power, better bed utilization and higher product recovery.

In somewhat of a departure from the original RPSA processes, Sircar (U.S. Pat. No. 5,071,449) discloses a process associated with a segmented configuration of adsorbent layers contained in a single cylindrical vessel. One or more pairs of adsorbent layers are arranged such that the product ends of each layer in a given pair face each other. The two separate layers of the pair operate out of phase with each other in the cycle. The intent is for a portion of the product from one layer to purge the opposing layer—the purge fraction controlled by either a physical constriction placed between the layers and/or by the total pressure drop across a layer (ranging from 200 psig to 3 psig). Particles in the size range of 0.2 mm to 1.0 mm, total cycle times of 6 s to 60 s, adsorbent layer depths of 6 inches to 48 inches and feed flow rates of one to 100 lbmoles/hr/ft$^2$ are broadly specified. An optional bimodal particle size distribution is suggested to reduce interparticle void volume. The process is claimed to be applicable to air separation, drying, and $H_2/CH_4$, $H_2/CO$ and $H^2CO/CO_2/CH_4$ separations.

Alpay et al. (Chem. Eng. Sci., 1994) studied the effects of feed pressure, cycle time, feed step time/cycle time ratio and product delivery rate in RPSA air separation for several ranges of particle sizes (0.15 mm to 0.71 mm) of 5A molecular sieve. His study showed that process performance was limited when adsorbent particles were either too small or too large. This was because ineffective pressure swing, low permeability and high mass transfer resistance (due to axial dispersion) were limiting at the lower end of particle size range, while high mass transfer resistance became limiting due to the size of the particles at the larger end of the particle size spectrum. Alpay found maximum separation effectiveness (maximum $O_2$ purity and adsorbent productivity) for particles in the size range 0.2 mm to 0.4 mm.

RPSA is clearly a special and distinct class of adsorption processes. The most distinguishing features of RPSA compared to conventional PSA can be described with respect to air separation for $O_2$ production. The pressure drop per unit bed length is an order of magnitude or more larger and the particle diameter of the adsorbent is usually less than 0.5 mm in RPSA. Total cycle times are typically shorter and the process steps are different in RPSA. Of these contrasting features, pressure drop and particle size constitute the major differences.

Other patents suggest the use of small particles in conventional PSA processes. Armond et al. (UK Pat. Appl. GB 2 091 121) discloses a superatmospheric PSA process for air separation in which short cycles ($\leq 45$ s) are combined with small particles (0.4 mm to 3.0 mm) to reduce the process power and the size of the adsorbent beds. Oxygen of 90% purity is produced under the preferred cycle times of 15 s to 30 s and particle sizes of 0.5 mm to 1.2 mm.

Hirooka et al. (U.S. Pat. No. 5,122,164) describes 6, 8 and 10-step VPSA processes for separating air to produce $O_2$. While the main thrust of this patent is the cycle configuration and detailed operation of the various cycle steps to improve yield and productivity, Hirooka utilizes small particles to achieve faster cycles. A broad particle range is specified (8×35 US mesh or 0.5 mm to 2.38 mm), but 12×20 US mesh or 0.8 mm to 1.7 mm is preferred. Half-cycle times of 25 s to 30 s are indicated (total cycle times of 50 s to 60 s).

Hay et al. (U.S. Pat. No. 5,176,721) also discloses smaller particles to produce shorter cycles, preferably in air separation. A vertical vessel with horizontal flow across the adsorbent is depicted. Broad range characteristics include particles less than 1.7 mm diameter, cycle times between 20 s–60 s and pressure drop across the adsorbent less than 200 mb (2.85 psig).

An alternative configuration includes an upstream portion of the adsorbent bed with particles of size greater than 1.7 mm, in which case the particle fraction smaller than 1.7 mm comprises 30% to 70% of the total adsorbent mass. The aspect ratio of the bed (largest frontal length to bed depth ratio) is specified to be between 1.5 and 3.0. Small particle fraction alternatives of 0.8 mm to 1.5 mm and 0.4 mm to 1.7 mm are also given, as well as adsorbent pressure drop as low as 50 mbar (0.7 psig).

Wankat (CRC Press, 1986; Ind. Eng. Chem. Res., 1987) describes a concept that he terms "intensification" whereby decreased particle diameter is employed to produce shorter columns and faster cycles. By non-dimensionalizing the governing mass balance equations for the adsorption process, a set of scaling rules are suggested which preserve the performance of the process in terms of product recovery, purity and pressure drop while increasing the adsorbent productivity. These theoretical results are based upon the similarity of dynamic adsorption behavior (at the same dimensionless times and column locations). The similarity concept presumes an idealized constant pattern MTZ, with the length of the mass transfer zone ($L_{MTZ}$) directly proportional to the square of the particle diameter when pore diffusion is controlling. Furthermore, decreasing $L_{MTZ}$ increases the fraction of bed utilized. Wankat indicates that increasing ($L/L_{MTZ}$) beyond a value of two to three, where L is the bed depth, results in minimal improvement in the fractional bed utilization. A layer of small-size particles placed on top of a layer of large-size particles is also suggested as a way to sharpen the mass transfer front. Some of the practical limitations to smaller scale and faster operation have been noted and include fluidization, column end effects, wall channeling and particle size distribution. The intensification concept was later extended to include non-isothermal and non-linear equilibrium effects in PSA processes by Rota and Wankat (AIChE J., 1990).

Moreau et al. (U.S. Pat. No. 5,672,195) has suggested higher porosity in zeolites to achieve improved $O_2$ yield and throughput in PSA air separation. A preferred porosity range of 0.38 to 0.60 is claimed in conjunction with a minimum rate coefficient. Moreau states that commercially available zeolites are not suitable for their invention since porosity is lower than 0.36.

Lu et al. (Sep. Sci. Technol. 27, 1857–1874 (1992); Ind. Eng. Chem. Res. 32: 2740–2751 (1993)) have investigated the effects of intraparticle forced convection upon pressurization and blowdown steps in PSA processes. Intraparticle forced convection augments macropore diffusion in large-pore adsorbents where the local pressure drop across the particle is high and where the pores extend completely through the particle. The higher intraparticle permeability is associated with high particle porosity, e.g. porosities ($\epsilon_p$)= 0.7 & 0.595.

OBJECTS OF THE INVENTION

It is therefore an object of the invention to increase efficiency, reduce cost and extend the production range of high performance adsorption processes for the separation of gases. It is a further object of the invention to increase efficiency, reduce cost and extend the production range of high performance adsorption processes for production of oxygen.

SUMMARY OF THE INVENTION

The invention is based upon the unexpected finding that mass transfer rates can be significantly increased by increasing the product of the particle porosity ($\epsilon_p$) and effective macropore diffusivity ($D_p$) in conjunction with a decrease in particle size. For the purposes of this invention, the product ($\epsilon_p D_p$) is termed the "intrinsic rate parameter" or "intrinsic rate property." The synergistic effect obtained from increasing ($\epsilon_p D_p$) simultaneously with a decrease in the particle diameter ($d_p$) results in a much larger increase in the mass transfer rate coefficient than can be achieved by manipulating any one, or combination of two, of these parameters. This increase in mass transfer rate can be applied to affect a significant improvement in separation performance. In a preferred embodiment an adsorption process uses an adsorbent zone comprising an adsorbent selected from the group consisting of A-zeolite, Y-zeolite, NaX, mixed cation X-zeolite, LiX having a $SiO_2/Al_2O_3$ ratio of less than 2.30, chabazite, mordenite, clinoptilolite, silica-alumina, alumina, silica, titanium silicates and mixtures thereof, wherein said adsorbent has a mass transfer coefficient for nitrogen of $k_{N2} \geq 12$ s$^{-1}$ and an intrinsic rate property for $N_2$, when measured at 1.5 bar and 300K, of ($\epsilon_p D_p$) $\geq 1.1 \times 10^{-6}$ m$^2$/s. Other preferred embodiments include the development of process parameters around which such materials should be used and preferred methods for increasing the intrinsic rate parameter.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
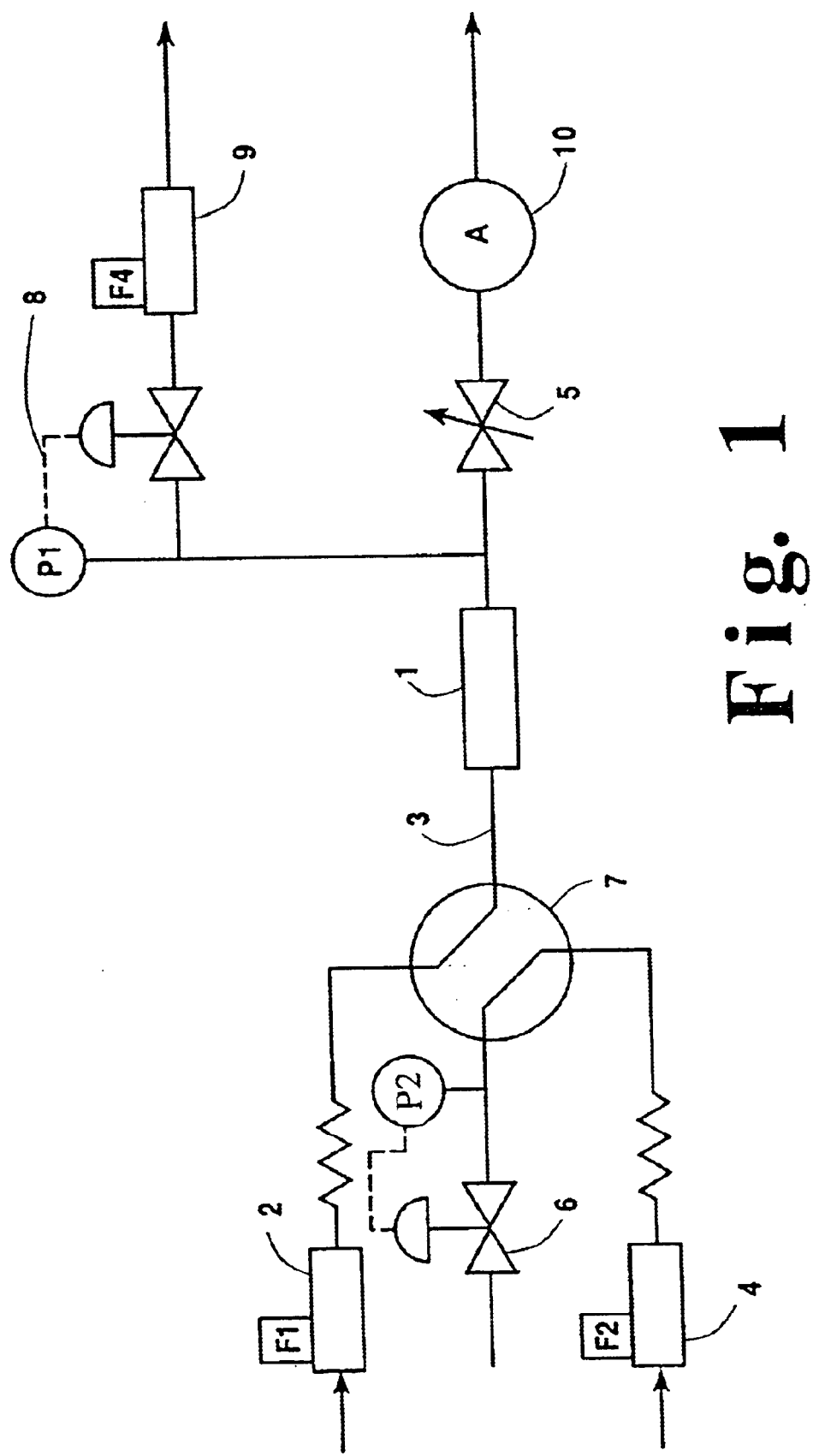
FIG. 1 is a schematic diagram showing the apparatus used to measure intrinsic adsorption rate.

The invention is based upon the recognition that sorption rates of adsorbent materials have a significant impact upon process performance, and that greater sorption rates can be affected by the proper combination of the intrinsic rate property ($\epsilon_p D_p$) and the particle size.

The objects of the invention are accomplished by implementing higher rates of mass transfer and by combining these with fast cycles and shallow beds. The preferred adsorption rate is established through a combination of the internal physical or intrinsic mass transfer rate properties of the adsorbent particle and the particle size in such a way to achieve significantly improved overall process performance. By the term "sorption rate" we mean the rate at which the adsorbate loading changes in a given time period in an adsorbent particle for a given adsorption separation process. This sorption rate is approximately proportional to the inverse of particle radius squared and is directly proportional to the product of the "effective diffusivity" and the particle porosity. An increase in this intrinsic rate property coupled with a decrease in particle size results in an increase in adsorption rate. By the term "intrinsic rate property" we mean the transport property that is due to the intrinsic characteristics of the adsorbent particle including, but not limited to the structure, size, shape and length, etc. of the macropores. Ideally, a material's intrinsic rate property is independent of particle size. In a preferred embodiment, the adsorption rate increases as the cycle time and bed depth decrease.

In practicing the invention, improved process efficiency is obtained by first affecting the largest sorption rate of the adsorbent that can be practically attained through modification of that material's internal physical properties, followed by an additional increase in adsorption rate through reduction in the adsorbent particle size. The necessary particle size is related to the required overall mass transfer rate coefficients and the cycle time/bed depth that lead to the lowest product cost. This strategy reduces the particle size only as much as is necessary to achieve high performance. This leads to the use of the largest particle size that satisfies the rate criteria, thereby resulting in the smallest bed pressure drop for given intrinsic properties of the adsorbent.

By increasing the mass transfer rate according to the invention, one may reduce the size of the mass transfer zone ($L_{MTZ}$) relative to the bed depth (L) and consequently, increase the working capacity of the adsorbent bed. Ackley et al. (WO 99/43416) have addressed a similar problem by specifically providing higher effective macropore diffusivity, i.e. $D_p \geq 3.5 \times 10^{-6}$ m$^2$/s in conjunction with reduced particle size. Such prior art fails, however, to consider the synergistic advantages of the combined effects of the intrinsic rate property and the particle size upon the reduction in the size of the mass transfer zone.

Other prior art simply teaches that smaller particles lead to shorter transfer zones, which in turn facilitate shorter beds and faster cycles. However, there are several problems that occur with decreasing particle size. First, pressure drop per unit bed length ($\Delta P/L$) increases, with decreasing particle size. This results in an increase in overall bed pressure drop $\Delta P$, unless the bed depth (L) is decreased. Further, onset of fluidization occurs at decreasing flow velocities as the particle size decreases. Although velocity can be reduced by increasing frontal bed area to lessen both the increase in pressure drop and the onset of fluidization, there are limitations to such area increases and in all cases a reduction in feed velocity generally results in a decrease in bed utilization. Finally, smaller particles are more difficult to immobilize and retain in the adsorber.

The present invention, on the other hand, recognizes that process performance is linked directly to mass transfer rate. In particular, such performance is the result of the coupled effects of mass transfer rate with process conditions such as cycle time, feed temperature and adsorption/desorption pressures. The invention further recognizes that particle size is only one of several adsorbent parameters effecting mass transfer rate and that the particle size required to achieve a desired rate varies depending upon the intrinsic mass transfer rate properties of the adsorbent particle. Since the particle size alone does not establish the rate characteristic of the adsorbent, specification of this parameter alone in the equilibrium and mass transfer zones does not insure maximum process performance.

The present invention considers the coupling of the effects of mass transfer rates (and the associated particle properties), the cycle time and the bed depth to significantly improve gas separation efficiency, i.e. improvements represented by increases in adsorbent productivity, decreases in process power requirements and/or increases in product recovery. The methodology is especially applicable to the production of oxygen in PSA processes incorporating $N_2$-selective adsorbents, e.g. type X or type A zeolites or advanced adsorbents such as highly Li-exchanged type X or other monovalent cation-exchanged zeolites. While this invention has been demonstrated for the case of air separation, the general methodology applies equally well to other gas phase separations: (1) that depend upon differences in equilibrium adsorption selectivity; and (2) in which the mass transfer resistance is dominated by diffusion in the macropores of the adsorbent particle, i.e. pores of dimension at least an order of magnitude greater than the diameter of molecules diffusing into or out of the particle. For zeolites, this dimension is on the order of 30 Å to 40 Å. For the purpose of this invention, macropores are defined as those pores in the range of approximately 0.0030 m to 20 m which corresponds also to the range of measurement by the standard mercury porosimetry method. Adsorbents may be deployed by this invention in one or more distinct adsorption zones, e.g. pretreatment and main adsorbent zones. One or more adsorbents may be contained in each zone, and the zones do not have to be contained in the same adsorbent vessel. The pretreatment zone is located nearest the feed inlet and its purpose is to remove any undesirable contaminants from the feed stream. Typical contaminants in air separation include water and carbon dioxide. Those skilled in the art will appreciate that zeolites, activated alumina, silica gel as well as other appropriate adsorbents may be utilized in the pretreatment zone. The main adsorbent zone is positioned downstream of the pretreatment zone (during the adsorption step) and contains adsorbent(s) selective for the primary heavy component(s) in the feed. The pretreatment zone may be excluded if there are no contaminants in the feed stream.

The processes of the invention are for the separation of at least two components of a gas phase mixture. Such separations are affected by differences in the equilibrium adsorption capacities of the components in the main adsorbent, i.e. at least one component in the mixture is more selectively adsorbed at equilibrium in comparison to the adsorption of the other components. The present invention is not concerned with kinetic adsorption processes where the primary separation mechanism results from differences in the diffusion rates of the components into the adsorbent.

The prior art most often projects an idealized concept of the mass transfer zone in which $L_{MTZ}$ is independent of the cycle time and bed depth. Due to the presence of gradients in temperature, pressure and adsorbate loading in the adsorbent bed throughout all steps of an actual bulk separation process however, the motion of the adsorption/desorption mass transfer fronts is not ideal.

Since process performance declines as the ratio of $L/L_{MTZ}$ decreases, the goal of performance improvement must be to maintain or increase this ratio. For air separation with highly-exchanged LiX zeolites, ratios of approximately 4.0 are desirable. Wankat (1987), however, teaches that increasing the ratio $L/L_{MTZ}$ beyond a value of 2.0 to 3.0 results in minimal improvement in process performance. For the purpose of the discussions below, the $L_{MTZ}$ is evaluated at the end of the adsorption step.

$L_{MTZ}$ is a consequence of the resistance to mass transfer which determines the adsorption rate. A linear driving force (LDF) model (E. Glueckauf, Trans. Faraday Soc. 51, 1540, 1955) can be used to represent adsorption rate $$\left(\frac{\partial \overline{w_i}}{\partial t}\right):$$

$$\rho_b \frac{\partial \overline{w_i}}{\partial t} = k_i(c_i - \overline{c_{s_i}}) \quad \text{(A-1)}$$

where ($w_i$) is the average loading of adsorbate (i), $\rho_b$ is the packed density of the adsorbent in the bed, $c_i$ and $c_{si}$ are average adsorbate gas phase concentrations in the bulk fluid and inside the particle in equilibrium with the adsorbate loading, respectively. The term in brackets is the "concentration driving force." $k_i$ is the mass transfer coefficient which can be represented as a combination of the intrinsic diffusion properties of the adsorbent and adsorbent particle properties as follows:

$$k_i = \frac{15\varepsilon_p(1-\varepsilon_b)D_{pi}}{r_p^2} \quad \text{(A-2)}$$

where $D_{pi}$ is the effective pore diffusivity, $\epsilon_p$ is the void fraction inside the particle, $\epsilon_b$ is the interparticle bed void fraction (void fraction external to the particles) which for the purposes of this disclosure varies from 0.34 to 0.37, and $r_p$ is the particle radius. The geometry of the macropores is imbedded in the term $D_{pi}$, i.e. a tortuosity factor ($\tau$) is commonly included in the denominator of Equation A-2, but this term has been imbedded in $D_{pi}$ for this disclosure. Equations A-1 and A-2 provide a convenient model to relate the various parameters that effect adsorption rate. While other mechanisms such as micropore diffusion, surface diffusion, film diffusion and bulk phase axial diffusion may influence the mass transfer coefficient, macropore diffusion dominates for many important separations, including air separation using type-X zeolites.

The component mass transfer coefficients $k_i$ can be determined by fitting the appropriate model to data obtained from a breakthrough experiment. Since $\epsilon_p$, $\epsilon_b$ and $r_p$ can all be determined by measurement, the effective diffusivity Dpi is extracted from Equation A-2. This methodology and Equation A-2 clearly distinguish the effects of intrinsic properties from the particle size upon adsorption rate. For the present invention, the product ($\epsilon_p D_p$) represents the intrinsic rate property of the adsorbent. When combined according to Equation (A-2) with the appropriate particle size, a rate coefficient ($k_{N2} \geq 12$ s$^{-1}$) can be obtained.

Equations A-1 and A-2 represent only one of several ways to characterize adsorption rate. The precise description or definition of adsorption rate is not critical as long as the description is consistently applied and reflects the dominant mechanisms involved for the separations of interest. Such separations include those dominated by equilibrium effects and mass transfer dominated by macropore diffusion in the particle. The effective diffusivity ($D_{pi}$) is an empiricallydetermined parameter, and determination must be consistent with the characterization of the adsorption rate.

Since the sorption rate associated with a given adsorbent's internal physical properties has been quantified for the examples herein, the breakthrough experiment employed to obtain the mass transfer rate coefficients and effective diffusivities is briefly described below. One skilled in the art will recognize that variations of this experiment may be used as long as the guiding criteria stated above are followed.

For the process of air separation, a breakthrough test is performed in two steps in which the flow rate, pressure and temperature of the feed gas are the same in both steps. With reference to FIG. 1, this process will be described. The first step involves saturation of the adsorbent bed 1 with $O_2$, the least selective component, provided via flow meter 2 and line 3. In the second step, air or a synthetic air mixture containing $N_2$ and $O_2$ is then introduced to bed 1 via flow meter 4 and line 3. Valve 6 operates in conjunction with flow meter 2 such that pressure of the air or synthetic air is maintained in an external loop until the four port valve 7 connects the air/synthetic air feed to line 3 such that the air/synthetic air flows into bed 1. The pressure, temperature and composition of the feed mixture in the second step should be representative of that in an adsorption step of an actual process, e.g. 1.5 bar, 300° K and feed air composition. The molar flux was approximately 10 mol/m²s, although this flux may be varied as required. The pressure is maintained substantially constant in the bed 1 by using a control valve 8 located on the downstream side of the adsorbent bed. The endspace and connecting piping volumes (dead volumes) are designed to be about 5% or less than that of the adsorbent bed volume (approximately 20 cm³).

The flow rate and concentration of $O_2$ are continuously and accurately monitored throughout step two via flow meter 9 and oxygen analyzer 10 until the breakthrough of $N_2$ is complete. Flow to analyzer 10 is maintained at a fixed amount via fixed valve 5. In step two, the more selectively adsorbed $N_2$ displaces the adsorbed $O_2$ already in the bed 1. As the bed nears saturation with the air mixture, the breakthrough of $N_2$ is reflected in a decrease in the $O_2$ concentration and an increase in overall flow rate of the effluent from the bed. The piping and adsorbent bed are maintained at the same temperature as the feed by immersing them in a thermostat bath controlled at the same temperature as the feed.

A computer model representing the test is then applied to simulate the breakthrough test. A detailed adsorption model, based upon the governing material and energy balances involved in the process, is incorporated. This model uses the same rate expression as that in Equation A-1. The model used here is represented by one dimensional plug flow with negligible axial dispersion. Additional characteristics of the model include: pressure drop (as determined by Darcy's Law or by the Ergun Equation), multicomponent isotherm (as determined by the loading ratio correlation), and adsorption rate (as determined by the linear driving force). A nonisothermal energy balance was used to account for heat transfer through the wall of the adsorbent bed. Simulations were performed by varying the mass transfer rate coefficients, $k_{N_2}$ and $k_{O_2}$, until the breakthrough effluent flow rate and concentration profiles of the simulation matched those of the experiment.

The prior art has virtually ignored sorption rate effects due to a material's internal physical properties, taking such properties as fixed and invariant. The few exceptions are Moreau et al. (who did not address diffusivity nor the significant offsetting effects of high porosity), Lu et al (who uses forced convection) and Ackley et al. (in which the primary focus is upon increased effective diffusivity), each of which has been noted in the background above. Moreau et al. considered only the effect of porosity upon process performance, demonstrating that such effects were relatively small for 5A adsorbent in the conventional range of porosity ($0.30 \leq \epsilon_p \leq 0.38$). As a result, Moreau teaches preferred porosity of $\epsilon_p > 0.38$. In Lu et al, the conditions favoring intraparticle forced convection are not particularly attractive to the present invention in which the intent is to increase the intrinsic rate property within conventional porosity levels while maintaining low bed pressure drop. The prior art of Ackley et al. (WO 99/43416) teaches improved sorption rate through increased effective diffusivity ($D_p \geq 3.5 \times 10^{-6}$ m²/s). The mass transfer coefficient is adjusted through the combined effects of the effective diffusivity and the particle size.

The present invention arises in part out of the recognition that the sorption rate, more particularly the intrinsic rate property, can be manipulated through specific formulation and/or processing of the adsorbent.

Examples of such formulations and/or processes include, the variation of binder content and type, the inclusion and subsequent burn-out of fibers having selected dimensions, concentrations and compositions, caustic digestion of the binder and controlled drying and activation. Adsorbents have been produced incorporating such methodologies and the resulting intrinsic rate property is greater than that for conventional, untreated/unmodified adsorbents. Further, such increases have been achieved while maintaining the porosity within the desired range of conventional adsorbents $\epsilon_p < 0.38$). Examples of such formulations are disclosed in Chao et al. (WO 99/43415).

Figure 2:
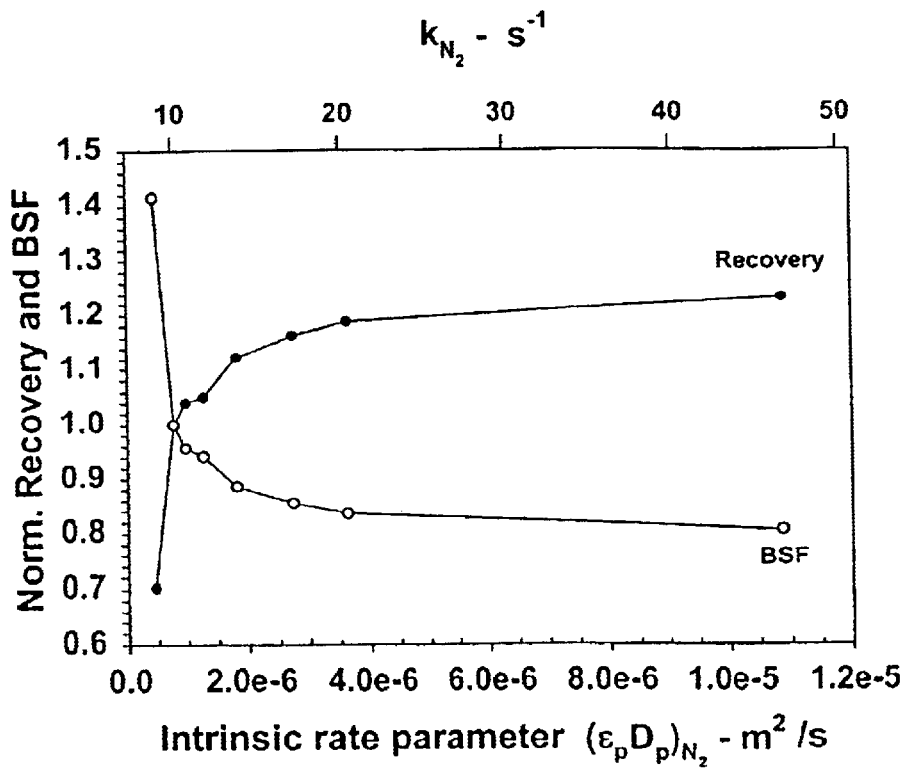
FIG. 2 is a graph showing the effect of the intrinsic rate parameter and mass transfer rate coefficient upon product recovery and bed size factor for a 60 s cycle.

Unexpectedly high gains in process performance were realized when the intrinsic rate parameter was increased. This is evident in FIG. 2 where both normalized product recovery and bed size factor (BSF) are shown as functions of the intrinsic rate property ($\epsilon_p D_p$) for $N_2$ and mass transfer rate coefficient ($k_{N_2}$). Surprisingly for an equilibrium-dominated separation, there is nearly a 20% improvement in performance when the intrinsic rate parameter (determined using the apparatus of FIG. 1, and at 300° K and 1.5 bar) increases from $7.7 \times 10^{-7}$ m²/s to $3.6 \times 10^{-6}$ m²/s. Further, improvement in process performance diminishes as the rate coefficient is increased beyond some level. As shown in FIG. 2, for a 60 second cycle (defined below), improvements in BSF and $O_2$ recovery lessen beyond the mass transfer coefficient $k_{N_2} = 40$ s$^{-1}$. Therefore it is preferred, for a 60 second cycle, to maintain the mass transfer coefficient range between $12 \text{ s}^{-1} \leq k_{N_2} \leq 40 \text{ s}^{-1}$. These results were obtained by simulation of a VPSA air separation process for the production of $O_2$ using highly exchanged LiX (2.0) adsorbent having greater than 95% Li. The particle size was held constant along with process conditions while the intrinsic rate parameter was varied for the results shown in FIG. 2. We should note that, as will be discussed below, for shorter cycles this range is preferred to be $k_{N_2} \geq 40$ s$^{-1}$.

Figure 3:
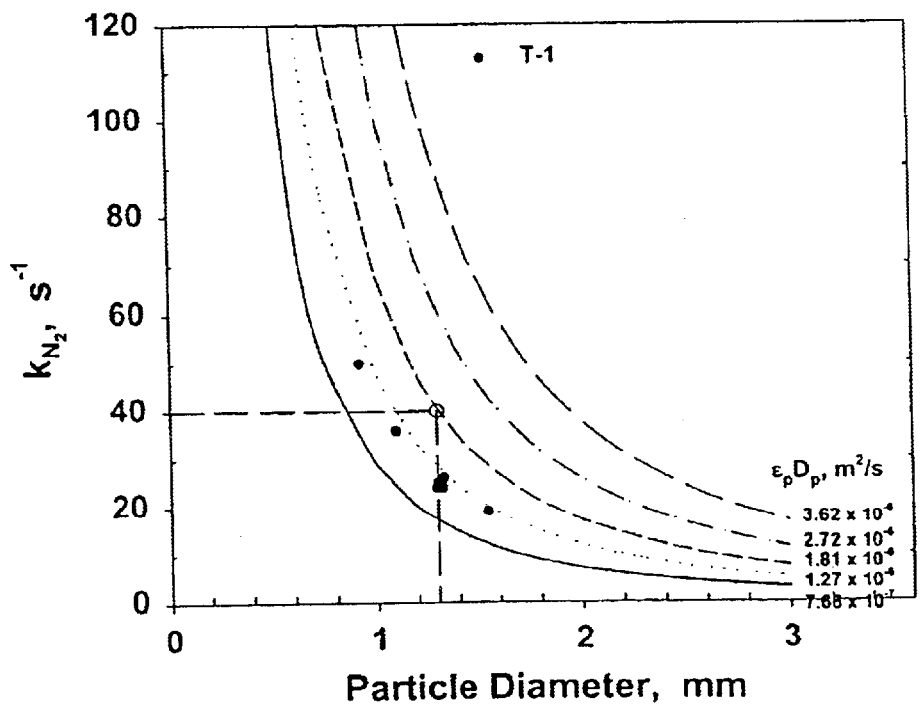
FIG. 3 is a graph showing the variation of mass transfer coefficient with particle size for various levels of the intrinsic rate parameter.

The desired rate coefficient can be obtained by manipulating the intrinsic properties of the adsorbent and/or the adsorbent particle size. The effect of particle size upon the $N_2$ mass transfer coefficient for various values of the intrinsic rate parameter ($\epsilon_p D_p$) is illustrated in FIG. 3. Equation A-2 was applied to construct the family of ($\epsilon_p D_p$) characteristics shown.

It is apparent from the results in FIG. 3 that the larger the intrinsic rate parameter, the larger the particle size that can be used to achieve a desired mass transfer coefficient. For example, a desired mass transfer rate coefficient $k_{N_2}=40$ s$^{-1}$ can be obtained with a 0.85 mm particle size when the intrinsic rate parameter for $N_2$ is 7.7×10$^{-7}$ m$^2$/s or with a 1.95 mm particle size when the intrinsic rate parameter for $N_2$ is 3.6×10$^{-6}$ m$^2$/s. We should note that when we refer to particle size ($d_p$), we refer to the average diameter of an adsorbent comprising particles distributed over a range of sizes, as those skilled in the art will recognize.

The synergistic effects of coupling the intrinsic rate parameter with changes in the particle diameter are evident from the resulting increase in the mass transfer rate coefficient. This effect is demonstrated by comparing conventional and improved-processing LiX (2.0) adsorbent.

LiX (2.0) containing clay binder, produced in beaded form by conventional methods and without caustic digestion, was evaluated as a reference sample (R-1). This adsorbent had an average particle diameter of 1.6 mm and an average porosity of 0.33. Breakthrough tests were conducted and simulations were performed for an air feed to determine the mass transfer rate coefficients according to the methods described above. Effective diffusivities were extracted using Equation (A-2). The effective $N_2$ pore diffusivity was determined by these methods to be 2.7×10$^{-6}$ m$^2$/s, while the intrinsic rate parameter $\epsilon_p D_p$=0.89×10$^{-6}$ m$^2$/s. The resulting $N_2$ mass transfer coefficient was 11 s$^{-1}$.

To demonstrate the features of the present invention, a LiX (2.0) adsorbent (sample T-1) was produced using caustic digestion to convert binder to zeolite. Care was taken in the activation of this material to minimize hydrothermal damage to the zeolite. Such caustic digestion and activation treatments are well known to those skilled in the art of zeolite manufacture. The size distribution of this adsorbent can be classified as 10×20 (US Sieve Series), while the average particle diameter of the distribution was 1.3 mm. The average porosity ($D_p$) of this material was 0.35. The $N_2$ mass transfer coefficient and the effective $N_2$ pore diffusivity were determined (by the methods referenced above) to be 24 s$^{-1}$ and 3.15×10$^{-6}$ m$^2$/s, respectively. The parameter $\epsilon_p D_p$=1.1×10$^{-6}$ m$^2$/s.

The effect of the decrease in the particle size from 1.6 mm to 1.3 mm is expected to increase $k_{N_2}$ from 11 s$^{-1}$ to approximately 17 s$^{-1}$, using Equation (A-2). The remainder of the increase in mass transfer coefficient to $k_{N_2}$=24 s$^{-1}$ for adsorbent T-1 is the result of the modest increase in the intrinsic rate parameter $\epsilon_p D_p$. Without the particle size change, the increase in $\epsilon_p D_p$ would have increased $k_{N_2}$ by only about 24%, e.g. from 11 s$^{-1}$ to 13.6 s$^{-1}$. When combined with a modest decrease in particle size, the intrinsic rate parameter provides an amplifying effect and the rate coefficient is more than doubled. Thus, the combination of modest decrease in particle size and modest increase in intrinsic rate parameter results in a synergistic effect that provides a substantial improvement in mass transfer rate coefficient.

The sample T-1 was separated into individual size fractions and each fraction was evaluated according to the same methods used to examine the distributed T-1 adsorbent. The intrinsic properties (($\square_p$ and $D_p$) of each size fraction remained essentially the same as the average of these parameters for the T-1 material. The results for $k_{N_2}$ as a function of particle diameter are shown in FIG. 3. The proportionality between $k_{N_2}$ and the inverse square of $r_p$ in Equation A-2 is supported by these data, noting that $k_{N_2}$ is determined by fitting the simulated breakthrough response to the experimental breakthrough data. FIG. 3 shows that preferred values of the $N_2$ mass transfer coefficient ($k_{N_2} \geq 12$ s$^{-1}$) can be achieved for this adsorbent (T-1) for average particle sizes $d_p \leq 1.9$ mm. A more-preferred $N_2$ mass transfer coefficient ($k_{N_2} \geq 20$ s$^{-1}$) can be achieved for average particle sizes $d_p \leq 1.5$ mm. Mass transfer coefficients as high as 40 s$^{-1}$ for $N_2$ can be obtained at reasonable average particle sizes $d_p \leq 1.0$ mm. By reasonable particle size, it is meant that both the retention of adsorbent in the bed and the bed pressure drop can be maintained at reasonable levels using conventional methods and without costly and/or extreme measures.

To demonstrate the effects of mass transfer rate upon process parameters, VPSA air separation process performance was determined for total cycle times of 60 s and 15 s. The following conditions were maintained: $O_2$ product purity at 90%, adsorption pressure at 1.5 bar, desorption pressure at 0.3 bar and feed temperature at 320° K. A simple eight-step cycle including pressurization, feed, purge, equalization and evacuation was employed. A highly exchanged (>95% Li) LiX adsorbent ($SiO_2/Al_2O_3$ ratio of 2.0) was used as the main adsorbent with bed depths of 1.37 m and 0.343 m for the 60 s and 15 s cycles, respectively. The mass transfer coefficients (determined by methods described previously) for $O_2$ were approximately 35% of those for $N_2$ for LiX adsorbents. The average feed air molar flux was 17 mol/m$^2$s.

Figure 4:
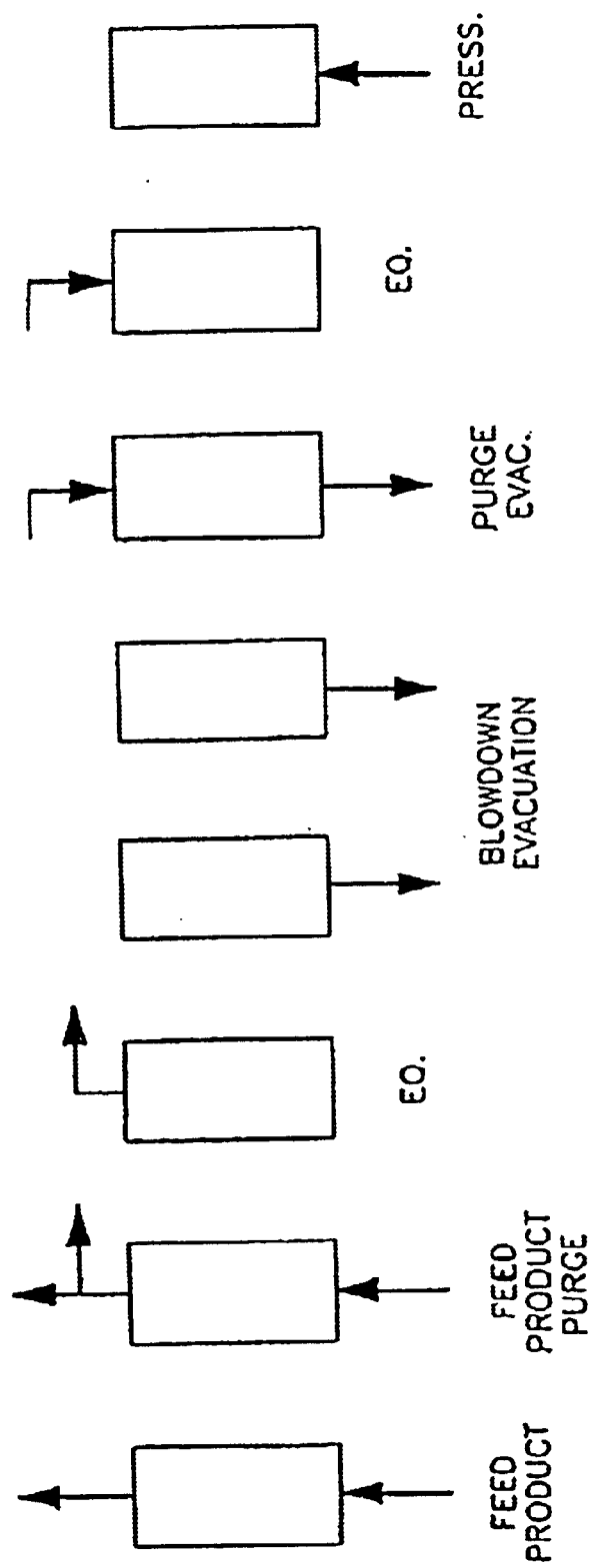
FIG. 4 is a schematic showing the eight step VPSA cycle used in the examples of the invention.

The cycle is described in the diagram in FIG. 4, while the step times are given in Table I for the 60 s cycle. The step times were all shortened by the ratio 15/60 for the 15 s cycle.

TABLE I

8-Step VPSA Cycle

| Step No. | Description | Duration(s) |
|---|---|---|
| 1.00 | Feed/Make Product | 6.00 |
| 2.00 | Feed/Make Product/Purge | 7.00 |
| 3.00 | Equalization Down | 4.00 |
| 4.00 | Blowdown/Evac. | 13.00 |
| 5.00 | Evacuation | 6.00 |
| 6.00 | Purge/Evac. | 7.00 |
| 7.00 | Equalization Up | 4.00 |
| 8.00 | Repressurization | 13.00 |

A detailed computer model of the process was used to determine the performance at various levels of adsorption rate. The adsorbent bed model equations are similar to those described above for the model of the rate test. The energy balance for the adsorbent is adiabatic, however, in the process model. The different bed pressure drops in each step of the cycle were maintained nearly constant for all process examples.

Figure 5:
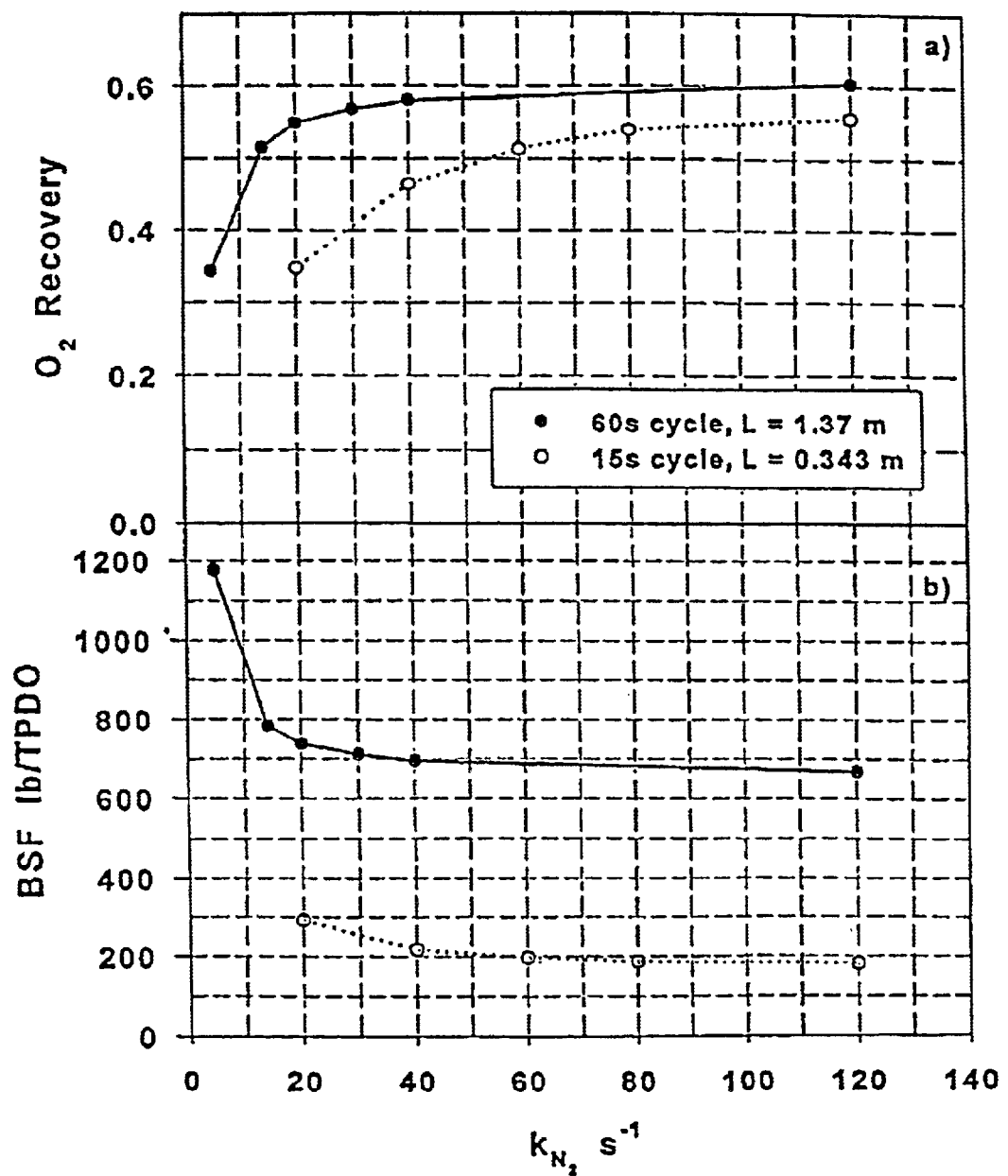
FIG. 5 is a graph showing VPSA performance for 15 s and 60 s cycles as a function of nitrogen mass transfer coefficient using LiX adsorbent.

The simulation results for $O_2$ recovery and BSF are shown in FIG. 5a and FIG. 5b. As illustrated therein, product recovery drops considerably for $N_2$ mass transfer coefficients $k_{N_2}$<20 s$^{-1}$ for the 60 s cycle, while a similar decline in performance is apparent for $k_{N_2}$<40 s in the 15 s cycle. The BSF results reflect similar conclusions. Likewise, performance gains diminish significantly for $k_{N_2}$>40 s$^{-1}$ and $k_{N_2}$>80 s$^{-1}$ for the 60 s and 15 s cycles, respectively. Increasing the adsorption rate alone nearly doubles the product recovery and halves the BSF, while the shorter cycle alone results in a BSF reduction of more than a factor of three with only a minor penalty in $O_2$ recovery. When combined, the effects of higher adsorption rate and short cycle time lead to a reduction in BSF of more than a factor of six. The values of the $N_2$ rate coefficient ($k_{N_2}$) leading to high performance in FIG. 5 reflect the process conditions stated: $O_2$ product purity at 90%, adsorption pressure at 1.5 bar, desorption pressure at 0.3 bar and feed temperature at 320° K for a feed composition of air. One skilled in the art will recognize that the same methodology described above can be applied to determine the preferred rate constants for other process conditions.

In general (for cycle times less than about one minute) a mass transfer coefficient $k_{N2} \geq 12$ s$^{-1}$ is preferred, with a rate constant of $k_{N2} \geq 20$ s$^{-1}$ being more preferred. As preferred values of $k_{N2}$ are, in part, dependent upon cycle time (as shown in FIG. 5), for shorter cycle times, greater values of $k_{N2}$ are preferred. Thus for a cycle time of 15 sec, a rate of $k_{N2} \geq 40$ s$^{-1}$ is also preferred, and a value of $k_{N2}$ up to 80 s$^{-1}$ is acceptable.

FIG. 5, which is consistent with the results of FIG. 2 and the preferred ranges set forth above, shows the best ranges of the adsorption rate coefficient for cycle duration from 15 s to 60 s. As indicated in Equation A-2, such rates may be achieved by increasing the effective diffusivity (DP) or the intraparticle void fraction ($\epsilon_p$) and/or by decreasing the particle size. Although each approach has theoretical limits, decreasing particle size or increasing porosity are accompanied by penalties to overall separation performance. Decreased particle size results in increased pressure drop per unit bed length, increased potential for fluidization and greater difficulty in particle retention in the bed as described above.

Intraparticle void fraction ($\epsilon_p$) is defined by Equation A-3:

$$\epsilon_p = \rho_p v_i \qquad \text{A-3}$$

where $\rho_p$ is the particle density, and $v_i$ is the internal macropore volume per unit mass of particle. $v_i$ may be determined by the well-known mercury porosimetry method.

Increasing the porosity or intraparticle void fraction reduces the overall active adsorbent content of the particle resulting in lower particle density. This in turn increases the volume of adsorbent required for a given $N_2$ adsorbate capacity (mol/g). There is a natural tendency for the particle density to decrease as pore volume is increased for a fixed adsorbent composition. Conversely, the pore volume usually decreases when $\rho_p$ increases. This apparent inverse relationship between particle density and macropore volume, while not in constant proportion, tends to restrict the practical range over which the void fraction $\epsilon_p$ can be varied for each particular type of adsorbent. Indeed, the intraparticle void fraction ($\epsilon_p$) of common synthetic zeolites is typically in the rather narrow range of 0.30 to 0.38 (Wankat, P. C., Rate-Controlled Separations, Elsevier Applied Science, 1990, pg. 226).

This range of porosities for zeolites is also related to a physical strength requirement, i.e. adsorbent particles in the bottom of large commercial beds must resist crushing under the weight of thousands of pounds of adsorbent contained in the adsorber vessel. High porosity/low density particles are subject to lower crush strength. Larger internal void fraction ($\epsilon_p$) also increases the non-selective gas storage volume in the adsorbent bed and thereby decreases the separation capability, i.e. reduces overall product recovery. While at first glance increasing $\epsilon_p$ appears to be a good way to increase adsorption rate (as indicated by Equation A-2), the offsetting effects in process performance and the potential mechanical difficulties arising from adsorbent particle breakdown make increasing porosity a limited choice for rate enhancement.

Ackley et al. (WO 99/43416) suggests that the preferred method for increasing adsorption rate is to increase the effective diffusivities ($D_p$) in the macropore space of the particle. Increased $D_p$ alone results in higher mass transfer coefficients with virtually no offsetting effects in performance or problems in decreased particle strength. The maximum effective diffusivity is limited, however, to the Maxwell (free space) diffusivity, e.g. for $N_2/O_2$ at 293° K and 1.0 atm, this limit is $2.2 \times 10^{-5}$ m$^2$/s (Hirschfelder, J. O. et al., Molecular Theory of Gases and Liquids, John Wiley & Sons, 1964, pg. 579). This limit is significantly above the effective diffusivities for $N_2/O_2$ in conventional zeolites. Significant increase in the rate coefficient was shown when combining $D_p \geq 3.5 \times 10^{-6}$ m$^2$/s with modest decrease in particle size. Ackley et al. discounted any potential benefits that might be obtained from increasing the porosity.

Increasing porosity beyond the conventional limit has a detrimental effect upon both the particle strength and the adsorbent's volumetric capacity. Increasing the porosity within the conventional range (($\epsilon_p < 0.38$) results in only small to modest increases in the rate coefficient. While decreasing particle size can substantially increase the rate coefficient, such an approach is accompanied by undesirable increase in adsorbent bed pressure drop. The present invention also recognizes that it may not be possible to control $D_p$ and $\epsilon_p$ completely independent of each other. Indeed, a situation is envisioned where the predominant macropore space is contained in ink bottle-shaped pores such that only a weak relationship exists between the pore diffusivity and the porosity. Conversely, $D_p$ and $\epsilon_p$ could be closely related when the macropores are of nearly uniform shape and size, i.e. as shape and size change, both pore diffusivity and porosity change. This invention shows that the most effective method to increase the rate of adsorption is to increase the intrinsic rate parameter ($\epsilon_p D_p$) as much as possible, while maintaining $\epsilon_p$ within the conventional range, coupled with a controlled decrease in particle size to minimize increase in pressure drop. By exercising such control in the simultaneous manipulation of $\epsilon_p D_p$ and particle size, a synergistic effect results which allows an increase in the adsorption rate without significant penalties in particle strength, volumetric capacity or bed pressure drop. Furthermore, the increase in the rate coefficient achieved by the simultaneous manipulation of $\epsilon_p D_p$ and $r_p$ of this invention is greater than can be achieved from the change in any one or two of these parameters alone.

By way of illustration, several examples are provided in which the intrinsic rate parameter $\epsilon_p D_p$ has been increased through formulation and/or processing of the aggregated product. The details of the formulation/processing are described in WO 99/43415 (Chao et al). The results demonstrate that intrinsic rate can be significantly increased in comparison to conventional adsorbents. Such improvement to the intrinsic adsorbent properties can then be applied to great advantage in separation processes as described herein. These examples are in no way limiting, but illustrative only, as one skilled in the art will appreciate that alternative methods for achieving increased intrinsic rate will lead to corresponding improvements in process performance.

Chao (WO 99/43415) has demonstrated various formulations and methods for producing adsorbents with intrinsic rate higher than that of conventional adsorbents. The intrinsic rate of adsorbents can be enhanced by first combining a low amount of binder with zeolite in the bead-forming step followed by caustic digestion (c.d.). The intrinsic rate characteristics of the adsorbent can be improved further by the addition of fiber with subsequent burnout. Not wanting to be restricted to any one method or formulation, the detailed procedure for producing adsorbent S-1 of the invention is herein described as one example of making such high rate adsorbents. The method of making S-1 involves the four primary steps of bead forming, caustic digestion, ion exchange and calcination as described below.

Bead Forming 2640 gm dry weight of NaKX(2.0) (wet weight 4190. gm) zeolite, 360 gm dry weight of the ECCA Tex-611 (wet weight 426 gm) kaolin clay were mulled for 15 min. while water was pumped in at a rate of 10 ml/min. The rate of water addition was then decreased to 4 ml/min for 40 min and the mixture was mulled another 20 min. The mulled mixture was then transferred to a DBY-10R Nauta Mixer (supplied by Hosokawa Micron Powder Systems) and mixed for about one hour. The lumps were broken down to return the mixture to a powder state. Water then was added slowly by an atomizer. As the moisture of the mixture increases, beads start to form. The growing of the beads was stopped by adding dried bonding mix at a time for harvesting the highest yield of 8×12 size beads.

The beads were dried in air overnight and then calcined in a Blue M oven with a dry air purge. The oven temperature was ramped up to 600° C. in 2 hours and then held at 600° C. for 2 hours during the dry air purge.

Caustic Digestion 1861.8 gm dry weight of calcined NaKX(2.0) beads of size 6×16 with 12% binder were used for caustic digestion. To prepare digestion solution, 360 gm of NaOH (9 mole) and 251.1 gm (4.475 mole) KOH was dissolved in 7386 gm of water. To this solution, 320 ml of sacrificial NaKX2.0 beads were added and stirred at 90 C. for 2 hours. The solution was left to settle and 6397.7 gm supernatant was collected. To this supernatant, 1477.2 ml of water, 72.0 gm of NaOH and 50.2 gm of KOH were added to make up for the discarded caustic. The resulting solution was used as digestion solution.

The beads were loaded into two stainless steel columns of 3 inch diameter and the solution from a common reservoir was recycled through each column at a flow rate of 30 ml/min. and temperature of 88° C. for 26 hours. After digestion the beads were washed by pumping 40 liter of NaOH solution (pH=12, 88 C.) through each column. The beads in each column were further washed with 30 liter of NaOH solution (pH =8.5, 88° C.). The product, NaKX2.0CD, was air-dried and screened to various particle size fractions.

Ion Exchange 694.5 gm dry weight of NaKX(2.0)CD 8×12 beads were loaded into a 3 inch i.d. glass column. A 10 inch layer of 3 mm Pyrex glass beads was placed at the bottom of the column to serve as a preheating zone for the solution. The column was wrapped with a heating tape. The ion exchange solution was first passed through a 15 liter 90° C. preheating flask to partially remove any dissolved air to prevent air bubbles from forming that could be subsequently trapped in the column. The hot solution was then pumped into the bottom of the column.

The ion exchange solution was prepared by dissolving 2162 gm LiCl in 80 liter distilled water (0.64M) then LiOH solution was added to adjust pH of solution to 9. The solution was pumped through the column at the speed of 15 ml/min. until ten to twelve times the stoichiometric amount of LiCl, for full Li-exchange of the beads, had been circulated through the column. After the ion exchange was completed, the product was washed with 30 liter of 90° C. distilled water at a flow rate of 60 ml/min. The pH of this water was adjusted to 9 by adding LiOH.

Drying and Calcination

The washed product was first air-dried and then dried further in a low temperature oven with ample air purge for 3 hours to bring the moisture content of the beads to about 12–15%. The dried beads were calcined in a Blue M oven with ample dry air purge. The oven temperature was ramped from room temperature to 600° C. in two hours and maintained at 600° C. for 40 minutes. The sample was removed from the oven at 450° C. and placed into a tightly sealed glass jar for cooling.

The $N_2$ mass transfer coefficients and intrinsic rate parameters ($\epsilon_p D_p$) were determined from breakthrough tests as described above for commercial zeolites available in bead form as 13XHP, 5AMG, LiX(2.5) and LiX(2.3) from UOP of Des Plaines, Ill. USA. These results are summarized in Table II for reference adsorption conditions of 1.5 bar and 300° K. The relatively narrow range of the intrinsic rate parameter for these commercial materials is reflective of the conventional processing methods for zeolites. The greater range of mass transfer coefficients for these same adsorbents occurs almost entirely from the differences in particle size.

Several different treatments were applied to LiX (2.0) zeolite in order to enhance the effective diffusivities for $N_2$ and $O_2$. As described above, various clay binder types and contents, and conversion of the binder to zeolite through caustic digestion (c.d.) and the use of a fiber additive with subsequent burnout were all explored. The effects of these treatments are illustrated in Table II for LiX (2.0) adsorbents (S1–S4).

TABLE II

Summary of Adsorbent Properties

| Sample | Zeolite ($SiO_2/Al_2O_3$) | Binder Content | Other | $\epsilon_p$ | $\epsilon_p D_p$ m²/s | $d_p$ mm | $k_{N_2}$ s⁻¹ |
|---|---|---|---|---|---|---|---|
| 13X | NaX (2.5) | | | 0.31 | 9.92 × 10⁻⁷ | 2.1 | 8 |
| 5A MG | NaCaA | | | 0.32 | 9.92 × 10⁻⁷ | 0.7 | 80 |
| Oxysiv-7 | LiX (2.5) | | | 0.36 | 9.36 × 10⁻⁷ | 0.55 | 100 |
| S-0 | LiX (2.3) | | | 0.33 | 9.57 × 10⁻⁷ | 1.9 | 10 |
| S-1 | LiX (2.0) | 12% | c.d. | 0.35 | 1.93 × 10⁻⁶ | 2.0 | 18 |
| S-2 | LiX (2.0) | 20% | c.d. | 0.27 | 5.4 × 10⁻⁷ | 2.0 | 5 |
| S-3 | LiX (2.0) | 20% | w/fiber c.d. | 0.32 | 1.09 × 10⁻⁶ | 2.0 | 10 |
| S-4 | LiX (2.0) | 12% | | 0.35 | 2.77 × 10⁻⁷ | 2.0 | 2.6 |

Sample S2 represents a zeolite formulation using 20% clay binder subsequently treated by caustic digestion (c.d.) to convert binder to zeolite. The resulting porosity is about 10% lower and the intrinsic rate parameter is about 46% lower for S2 than these same properties for 13X and 5A MG. When the binder content is lowered to 12%, there is a substantial difference in the intrinsic rate as a result of the caustic digestion and conversion of binder to zeolite. The c.d. sample S1 has an intrinsic rate nearly seven times greater than that for sample S4 (no c.d.) with no significant difference in the porosities. Furthermore, the intrinsic rate parameter of sample S1 is two times greater than that of LiX 2.3 adsorbent (S0)—also with only a small change in porosity. In terms of rate coefficient, $k_{N_2}$ of S1 is 1.8 to 7.0 times larger than that of any of the other materials of equal particle diameter in Table II. Samples S1–S4 all use the same type of clay binder (kaolin). In samples S1–S3, this binder is converted to zeolite by caustic digestion. Although samples S1–S3 have essentially the same final chemical composition (LiX (2.0)), the intrinsic rate parameters for these samples vary widely due to the different pore structures created as a result of the different formulation and processing steps.

It is evident from these results that substantial increases in intrinsic rate can be obtained through special formulation and processing of the adsorbent. Additionally, these improvements in intrinsic rate are obtained while maintaining the adsorbent particle porosity in the same range as conventional adsorbents. Such increases in this intrinsic rate property of the adsorbent can then be coupled with the proper choice of particle size and process operating conditions to achieve significant process performance advantages—subsequently captured as a reduction in the overall cost of the product.

Once the sorption rate associated with a material's internal physical properties is obtained within the manufacturing and cost constraints of a given methodology, the results of FIG. 5 are combined with the characteristics of FIG. 3 to select the particle size necessary to achieve the desired mass transfer rate coefficient; i.e. a rate coefficient that leads to high process performance and minimum product cost. A value of $\epsilon_p D_{pN2}=1.81\times10^{-6}$ m$^2$/s for a LiX(2.0) (>95% exchanged) adsorbent is selected to illustrate the concept. Along this $\epsilon_p D_{pN2}$ characteristic in FIG. 3, particle diameters of 1.85 mm, 1.3 mm and 0.92 mm correspond to values of $k_{N2}=20$ s$^{-1}$, 40 s$^{-1}$ and 80 s$^{-1}$, respectively. Using a bed of 1.37 m depth containing 1.85 mm particles as a reference condition for pressure drop, the bed depths for the smaller particle size configurations are now established from the Ergun equation to keep the overall bed pressure drop the same in all three cases. Note that a lower pressure drop could have been chosen as a reference condition. The cycle time was then adjusted to maintain a minimum product purity of 90% O$_2$. In the first three cases the endspace volumes (void space above and below the adsorbent bed inside the vessel) were maintained constant. The results of process simulations are shown in Table III and FIG. 6.

TABLE III

Summary of Simulation Results:
Bed Depth/Cycle Time/Particle Size Study

|  | (P_3) | (R_2) | (R_3) | (R-3rv) |
|---|---|---|---|---|
| O$_2$ Purity (%) | 90. | 90. | 91. | 90. |
| O$_2$ Recovery | 0.55 | 0.52 | 0.45 | 0.54 |
| Throughput TPDO | 58.00 | 55.00 | 48.00 | 57.00 |
| BSF lb/TPDO | 737.00 | 387.00 | 224.00 | 187.00 |
| $k_{N2}$ s$^{-1}$ | 20.00 | 40.00 | 80.00 | 80.00 |
| Particle diameter $d_p$, mm | 1.85 | 1.30 | 0.92 | 0.92 |
| bed depth, m | 1.37 | 0.69 | 0.34 | 0.34 |
| Lower endspace void fraction | 0.14 | 0.30 | 0.59 | 0.14 |
| Upper endspace void fraction | 0.18 | 0.38 | 0.76 | 0.18 |
| Cycle time, sec. | 60 | 30 | 15 | 15 |

The first three columns in Table III show the significant reduction (up to 70%) in BSF that is achieved with the shorter cycles enabled by higher mass transfer rates. Unfortunately, the product recovery and throughput decline substantially for the R_3 case with 0.92 mm particle diameter and a 0.343 m bed depth. This is very undesirable due to the negative impact of reduced recovery upon power consumption.

A major contributor to this problem is the increasing fraction of endspace void volumes relative to bed volume as the bed depth (and bed volume) decrease as shown in Table III, i.e. the upper and lower endspace void fractions increase from 0.18 and 0.14 to 0.76 and 0.59, respectively. A fourth case (R_3 rv) was simulated with a reduction in endspace volumes to restore the fractional endspace voids to the same as that in the 1.37 m bed depth reference case (P_3). The product recovery and throughput are nearly fully restored. Thus, it is preferred to maintain the void fraction of each of the endspaces at 30% or less than the total adsorbent bed volume. As the intrinsic rate parameter increases, the performance characteristics in FIG. 6 shift to the right, i.e. similar short-cycle performance gains are realized at even larger particle sizes.

Figure 6:
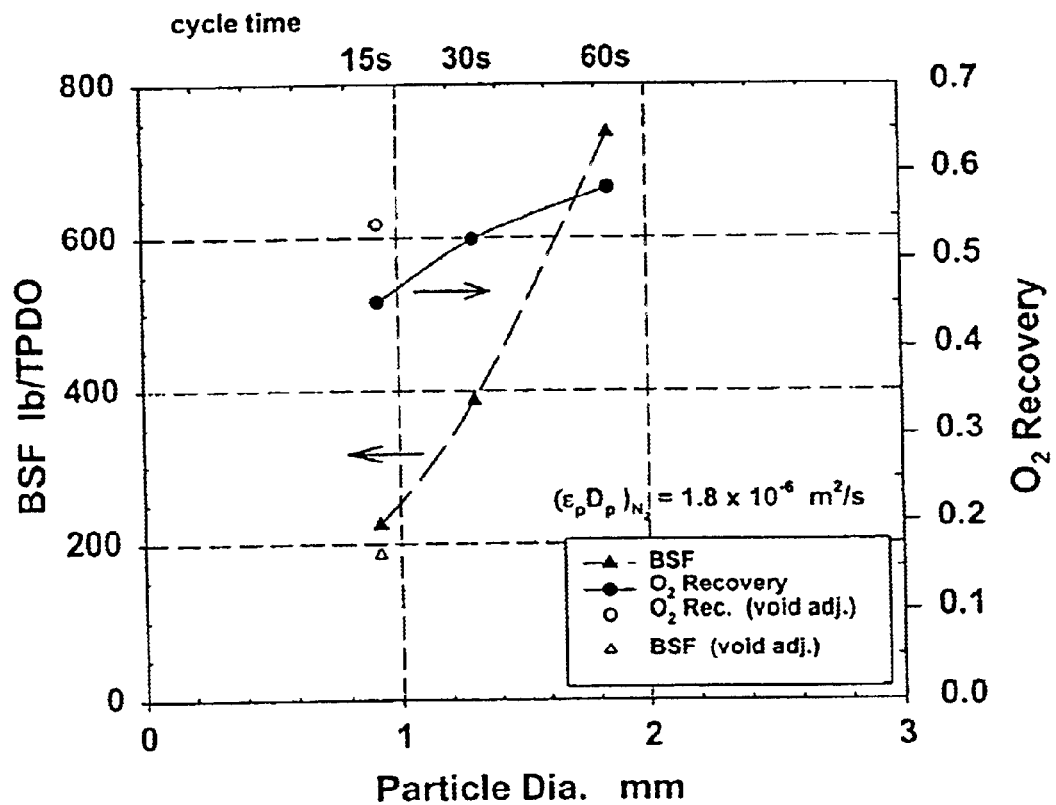
FIG. 6 is a graph showing the effect of particle size and cycle time upon VPSA performance at a fixed intrinsic rate.

The information in FIGS. 3, 5 and 6 are now combined with the concepts of the invention and the example results to define the preferred particle size and intrinsic rate, i.e. combinations that will result in the highest bed utilization and overall best process performance for various cycle times for VPSA air separation using LiX (2.0). The results are shown in FIG. 7 for the range of intrinsic rate parameter for N$_2$, $7.66\times10^{-7} \leq \epsilon_p D_{pN2} \leq 4.0\times10^{-6}$ m$^2$/s.

Figure 7:
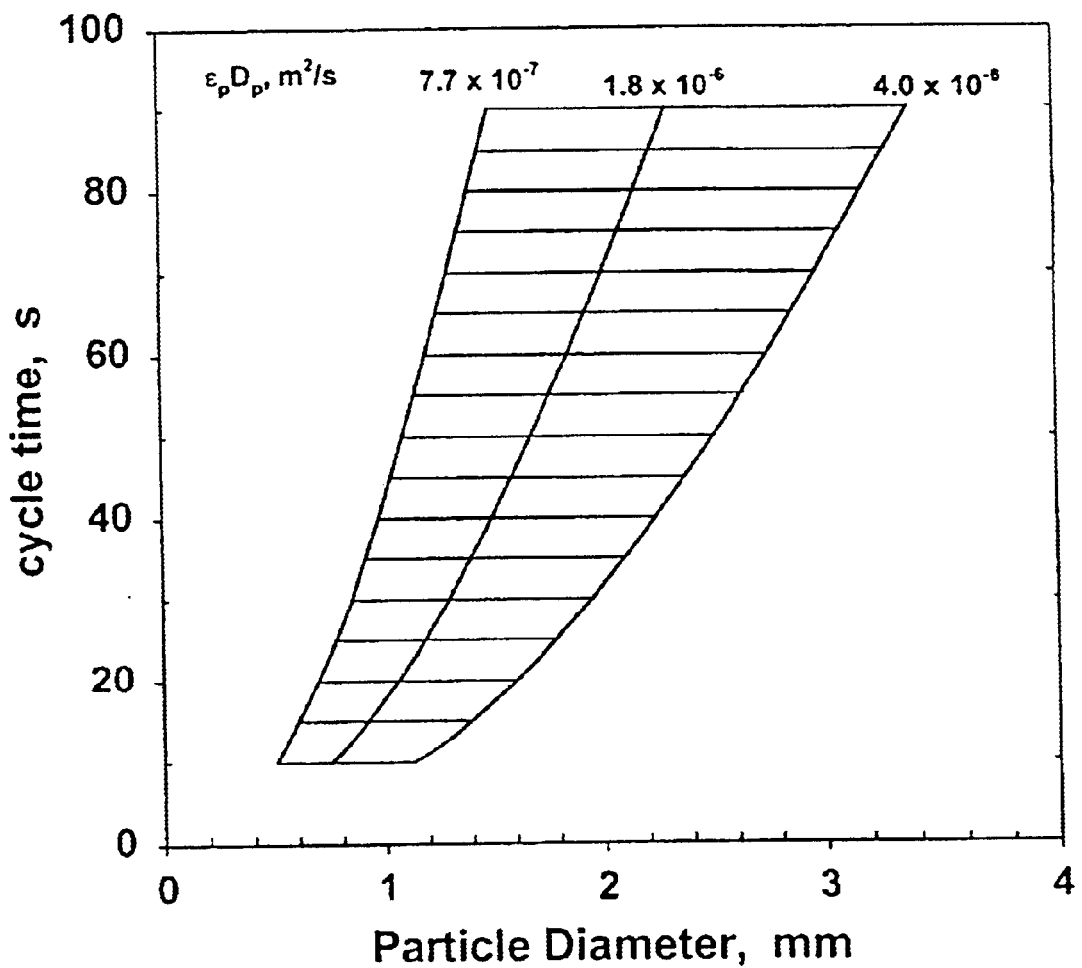
FIG. 7 is a graph showing preferred cycle time/particle size combinations for various $N_2$ intrinsic rates.

From FIG. 7, it is evident that the larger the intrinsic rate parameter, and thereby the larger the sorption rate derived from this internal physical property of the adsorbent, the larger the particle size that can be accommodated to achieve a desired performance, e.g. for a cycle time of 30 s, a particle size within the range of about 0.85 mm to about 2.0 mm, preferably between about 1.1 mm and about 1.6 mm will be required depending upon the intrinsic rate properties of the adsorbent. Thus, when the intrinsic rate parameter $\epsilon_p D_{pN2}=1.81\times10^{-6}$ m$^2$/s, a particle diameter of 1.3 mm is recommended for a cycle time of 30 s while a particle diameter of 1.75 mm is best for 55 s cycle.

Considering the results of FIGS. 5–7, it is preferred that the rate coefficient ($k_{N2}$) be coupled with a $\epsilon_p D_{pN2}$ of greater than or equal to $1.1\times10^{-6}$ m$^2$/s, preferably $1.3\times10^{-6}$ m$^2$/s, more preferably $1.5\times10^{-6}$ m$^2$/s.

Although FIG. 6 indicates that the highest bed utilizations (lowest BSF) correspond to the shortest cycles, there may be compelling design and cost reasons to operate above the shortest cycle times, e.g. the lowest product cost may not correspond to the shortest cycle if endspace void volume cannot be controlled in the desired range, valve cycle times may limit the shortest cycle times, etc. For these reasons, FIG. 7 provides a guide for these parameters over a significant cycle time range. In general, the bed depth will scale directly with the cycle time as illustrated in Table III.

To accommodate a range of desirable particle sizes: for a cycle time of less than or equal to 80 s, the bed depth is preferably less than or equal to about 2.0 m; for a cycle time of less than or equal to 60 s, the bed depth is preferably less than or equal to about 1.5 m; similarly for a cycle time of less than or equal to 40 seconds, the bed depth is preferably less than or equal to 1.2 m; and for a cycle time of less than or equal to about 20 s, the bed depth is preferably less than or equal to about 0.63 m.

As indicated above, an object of the present invention is to make significant improvements in adsorbent utilization and product recovery through enhancement of the rate characteristics of the adsorbent.—This can be achieved primarily from a combination of an increase in the intrinsic rate parameter ($\epsilon_p D_p$) and the proper selection of the average particle diameter. The improved recovery achieved under the conditions of the invention also leads to reduced power consumption per unit of product produced. The invention is preferably directed at equilibrium-based adsorption separation processes with mass transport dominated by intraparticle pore diffusion. While the examples have been directed at air separation using a single main adsorbent, the invention is not limited to binary mixtures, nor to air as a feed nor to a single main adsorbent.

Further, when more than a single separation is to be achieved, it is contemplated to include one or more adsorbents as main adsorbents. In such a case, each adsorbent would be responsible for a different separation or a different level of the same separation. Multiple mass transfer zones may then be present in the process. An analysis similar to that described above would be performed for each of the adsorbent/adsorbate combinations where overcoming significant mass transfer resistance limitations would lead to overall improvements in process performance. Thus, the properties (particularly those related to the rate of adsorption) of the different adsorbent materials in the main adsorbent zone are selected to maximize all of the separations required of the process. Examples of such processes include the recovery of $H_2$ from $H_2/CO/CO_2/CH_4$ mixtures; prepurification, including the removal of $H_2O$ and $CO_2$ from air; separation of Ar from air or $N_2$ or $O_2$; drying of process streams; and the recovery of $CO_2$ from flue gases or from $H_2$ PSA tail gas.

Type X zeolite adsorbents are suggested for air separation, most preferably highly-exchanged LiX as described by Chao (U.S. Pat. No. 4,859,217). Other type X materials with monovalent cations or mixed cations are also applicable to the present invention such as those suggested by Chao (U.S. Pat. No. 5,174,979). The invention is also applicable to any type of equilibrium-selective adsorbent material including, but not limited to, A-zeolite, Y-zeolite, chabazite, mordenite, clinoptilolite and various ion exchanged forms of these, as well as silica-alumina, alumina, silica, titanium silicates and mixtures thereof.

It should also be clear that the present invention can be practiced with various deployments of adsorbents in the main adsorbent zone, e.g. layers and mixtures of adsorbents of various types or of the same type but with varying adsorption and/or physical characteristics. For example, the enhanced rate concepts of this invention could be applied to the layered beds suggested by Ackley in U.S. Pat. No. 6,152,991, as well as Notaro et al (U.S. Pat. No. 5,674,311) and Watson et al (U.S. Pat. No. 5,529,610).

Finally, a further improvement over the basic invention can be obtained by distributing the adsorbents with different rate properties to minimize pressure drop and/or mass transfer zone size. The selection of properties should be made in order to increase the rate of adsorption and minimize the fractional size(s) of the mass transfer zone(s) at the end of the adsorption step.

The present invention teaches a method to improve process performance by reducing mass transfer limitations while minimizing any increase in process pressure drop. Bed depth and cycle time are reduced to compensate for increased specific pressure drop (pressure drop per unit depth of adsorbent) when particle size is reduced. There may be cases, however, where either a further reduction in pressure drop is desired and/or where the use of adsorbents with different rate properties is desirable or necessary. In such an embodiment, a poorer sorption rate-quality adsorbent (low mass transfer coefficient) could be used in the equilibrium zone and a higher sorption rate-quality version of the same adsorbent (high mass transfer coefficient) in the mass transfer zone.

It is further contemplated that the poorer rate-quality material in this latter condition could also be of smaller diameter. This would result in a configuration with regard to particle sizes in the adsorbent bed that is completely opposite to the prior art teachings. Thus when multiple adsorbents with different rate characteristics must be used, maintaining the adsorbent with the largest mass transfer rate coefficient in the mass transfer zone insures the best overall process performance.

Since the mass transfer zone forms initially and develops in what eventually becomes the equilibrium zone (at the end of the adsorption step), the rate of adsorption cannot be too low relative to that in a succeeding layer of adsorbent. This is because the leading edge of the mass transfer zone would erupt from the adsorber before the trailing edge crosses the boundary between the two materials. This would result in a reduced size of the equilibrium zone and increased size of the mass transfer zone and consequently, overall lower product recovery and/or purity.

This condition may be minimized by selecting the adsorbents and the mass transfer coefficients (MTC) of the most selective component such that the size of the mass transfer zone in the adsorbent of the lowest MTC is no more than twice that of the size of the mass transfer zone in the adsorbent of the highest MTC.

The problem may also be solved by distributing the adsorbents in such a way as to achieve a gradual increase in mass transfer coefficients (in contrast to discrete layers) from the inlet to the outlet of the adsorber. When multiple adsorption zones are contained in the main adsorbent for the purpose of multiple separations, it is appreciated that the concept of mass transfer coefficient gradients (either by discrete layers or by gradual change) can be applied individually to each included separation zone.

The concepts of this invention are not limited to any specific set of process conditions but may be applied over a wide range of process conditions, e.g. temperatures, pressures, feed velocities, etc. It is only necessary to evaluate the rate characteristics of the adsorbent at the process conditions of interest before applying these concepts in order to insure maximum process performance. Likewise, these concepts can be applied to single-bed as well as multi-bed processes operating with subatmospheric (VSA), transatmospheric (VPSA) or superatmospheric (PSA) cycles.

In addition, the use of such materials would allow for operation of PSA/VPSA/VSA processes at relatively low pressure ratios (e.g. the ratio of the highest adsorption pressure to the lowest desorption pressure), preferably less than 7.0 and more preferably less than 5.0, still more preferably less than 4.0 and most preferably less than 3.0.

While the process examples disclosed in this application use an eight-step cycle, the benefits of the invention may also apply to simpler cycles comprising fewer steps and more complex cycles comprising additional steps.

The enhanced-rate concepts described here are not limited to any particular adsorber configuration and can be effectively applied to axial flow, radial flow, lateral flow, etc. adsorbers. The adsorbent may be constrained or unconstrained within the adsorber vessel.

The benefits of the invention may also be obtained in cycles in which the primary product is the more selectively adsorbed component (e.g. $N_2$) or in cycles wherein both the more and less strongly held component are recovered as product.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A process for separating a preferred gas from a gas mixture containing said preferred gas and other less preferred gases, said process comprising passing said gas mixture over an adsorbent having a mass transfer coefficient (MTC) for nitrogen of $K_{N2} \geq 12 \text{ s}^{-1}$ and an intrinsic rate for $N_2$, when measured at 1.5 bar and 300° K, of $\epsilon_p D_{pN2} \geq 1.1 \times 10^{-6}$.

2. The process of claim 1 wherein the adsorbent has particles having an average size dp of $\leq 1.9$ mm.

3. The process of claim 1, wherein $\epsilon_p \leq 0.38$.

4. The process of claim 3, wherein $\epsilon_p \geq 0.30$.

5. The process of claim 1, wherein $\epsilon_p D_{pN2} \leq 1.3 \times 10^{-6}$.

6. The process of claim 1, wherein said process comprises adsorption and desorption steps, and wherein the pressure ratio of the highest adsorption pressure to the lowest desorption pressure is less than 7.0.

7. The process of claim 6, wherein the pressure ratio is less than 5.0.

8. The process of claim 6, wherein the pressure ratio is less than 4.0.

9. The process of claim 6, wherein said desorption step takes place under subatmospheric conditions.

10. The process of claim 1, wherein the preferred gas is oxygen.

11. The process of claim 1, wherein the gas mixture is air.

12. The process of claim 1, wherein said process takes place in a radial flow, axial flow or lateral flow adsorber.

13. The process of claim 12, wherein said adsorbent is either constrained or unconstrained within said adsorber.

14. The process of claim 1, wherein said adsorbent is a selected from the group consisting of X-zeolite, A-zeolite, Y-zeolite, chabazite, mordenite, clinoptilolite, silica-alumina, silica, titanium silicates and mixtures thereof.

15. The process of claim 1, wherein said adsorbent contains lithium.

16. The process of claim 1, wherein said adsorbent is an X-zeolite containing lithium.

* * * * *

UNITED STATES PATENT AND TRADEMARK OFFICE
CERTIFICATE OF CORRECTION

PATENT NO. : 6,790,260 B2
APPLICATION NO. : 09/968926
DATED : September 14, 2004
INVENTOR(S) : Ackley et al.

It is certified that error appears in the above-identified patent and that said Letters Patent is hereby corrected as shown below:

Col. 20 lines 66-67, col. 21 lines 1-5
In claim 1, replace "A process for separating a preferred gas from a gas mixture containing said preferred gas and other less preferred gases, said process comprising passing said gas mixture over an adsorbent having a mass transfer coefficient (MTC) for nitrogen of $K_{N2} \geq 12$ s$^{-1}$ and an intrinsic rate for $N_2$, when measured at 1.5 bar and 300° K, of $\varepsilon_p D_{pN2} \geq 1.1 \times 10^{-6}$" with -- A process for separating a preferred gas from a gas mixture containing said preferred gas and other less preferred gases, said process comprising passing said gas mixture over an adsorbent having a mass transfer coefficient (MTC) for nitrogen of $k_{N2} \geq 12$ s$^{-1}$ and an intrinsic rate for $N_2$, when measured at 1.5 bar and 300°K, of $\varepsilon_p D_{pN2} \geq 1.1 \times 10^{-6}$ m$^2$/s, wherein $D_p < 3.5 \times 10^{-6}$ m$^2$/s--.

Col. 21 line 10
In claim 5, replace "The process of claim 1, wherein $\varepsilon_p D_{pN2} \leq 1.3 \times 10^{-6}$" with --The process of claim 1, wherein $\varepsilon_p D_{pN2} \leq 1.3 \times 10^{-6}$ m$^2$/s--.

Col. 22 lines 9-12
In claim 14, replace "The process of claim 1, wherein said adsorbent is a selected from the group consisting of X-zeolite, A-zeolite, Y-zeolite, chabazite, mordenite, clinoptilolite, silica-alumina, silica, titanium silicates and mixtures thereof" with --The process of claim 1, wherein said adsorbent is selected from the group consisting of X-zeolite, A-zeolite, Y-zeolite, chabazite, mordenite, clinoptilolite, silica-alumina, silica, titanium silicates and mixtures thereof --.

Signed and Sealed this

Twenty-first Day of November, 2006

JON W. DUDAS
*Director of the United States Patent and Trademark Office*